(12) United States Patent
Izumi et al.

(10) Patent No.: US 8,143,817 B2
(45) Date of Patent: Mar. 27, 2012

(54) ELECTROMAGNETIC ACTUATOR DRIVING METHOD

(75) Inventors: Tomohiro Izumi, Osaka (JP); Yasuo Ibuki, Hikone (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 477 days.

(21) Appl. No.: 12/382,704

(22) Filed: Mar. 23, 2009

(65) Prior Publication Data
US 2009/0243519 A1    Oct. 1, 2009

(30) Foreign Application Priority Data

Mar. 26, 2008   (JP) ................................. 2008-081957

(51) Int. Cl.
*H02P 1/00* (2006.01)
*H02P 3/00* (2006.01)

(52) U.S. Cl. ........ 318/114; 318/119; 318/128; 318/135; 310/15; 310/36

(58) Field of Classification Search .................. 318/119, 318/135, 114, 128; 310/15, 36; 417/22, 417/411
See application file for complete search history.

(56) References Cited

U.S. PATENT DOCUMENTS

| | | | |
|---|---|---|---|
| 5,023,528 A | 6/1991 | Saidin et al. | |
| 5,128,575 A | 7/1992 | Heidelberg et al. | |
| 5,736,797 A * | 4/1998 | Motohashi et al. | 310/36 |
| 5,883,478 A | 3/1999 | Thesling | |
| 5,942,865 A | 8/1999 | Kim | |
| 6,133,701 A * | 10/2000 | Gokturk et al. | 318/114 |
| 6,181,090 B1 * | 1/2001 | Amaya et al. | 318/128 |
| 6,351,089 B1 * | 2/2002 | Ibuki et al. | 318/128 |
| 6,441,571 B1 * | 8/2002 | Ibuki et al. | 318/114 |
| 6,548,971 B2 * | 4/2003 | Gokturk | 318/114 |
| 6,774,588 B2 * | 8/2004 | Ibuki et al. | 318/119 |
| 7,235,936 B2 * | 6/2007 | Oba et al. | 318/114 |
| 7,307,397 B2 * | 12/2007 | Izumi et al. | 318/560 |
| 7,372,221 B2 * | 5/2008 | Reinschke | 318/135 |
| 7,474,065 B2 * | 1/2009 | Kraus | 318/119 |
| 2002/0175643 A1 * | 11/2002 | Gokturk | 318/114 |

(Continued)

FOREIGN PATENT DOCUMENTS

CN    1716756    1/2006

(Continued)

OTHER PUBLICATIONS

The Chinese office action dated Dec. 9, 2010 and English summary thereof, total of 8 pages.

(Continued)

*Primary Examiner* — Paul Ip
(74) *Attorney, Agent, or Firm* — Bacon & Thomas, PLLC

(57) ABSTRACT

An electromagnetic actuator includes a stator and a movable body. The stator includes a core provided with magnetic poles and a coil wound on at least one of the magnetic poles. The movable body includes a permanent magnet and supported in such a manner as to make reciprocating in a direction perpendicular to a direction in which the permanent magnet opposes the magnetic poles. The movable body is reciprocated upon applying an alternating voltage to the coil. An electromagnetic actuator driving method for driving the electromagnetic actuator includes performing feedback control of the alternating voltage in which the alternating voltage is applied to the coil during a first half of a control period and in which an induced electromotive force generated in the coil during a second half of the control period is used as a control signal.

9 Claims, 5 Drawing Sheets

U.S. PATENT DOCUMENTS

| | | | |
|---|---|---|---|
| 2003/0173835 A1 | 9/2003 | Nishiyama et al. | |
| 2004/0005222 A1 | 1/2004 | Yoshida et al. | |
| 2005/0146296 A1* | 7/2005 | Klemm et al. | 318/119 |
| 2005/0275294 A1* | 12/2005 | Izumi et al. | 310/15 |
| 2006/0145547 A1* | 7/2006 | Kraus | 310/36 |
| 2007/0236160 A1* | 10/2007 | Reinschke | 318/135 |

FOREIGN PATENT DOCUMENTS

| | | |
|---|---|---|
| EP | 0 674 979 | 3/1995 |
| EP | 0 860 933 | 8/1998 |
| EP | 1 487 091 | 6/2000 |
| EP | 1 231 706 | 1/2002 |
| EP | 1610447 | 12/2005 |
| EP | 1 698 044 | 9/2006 |
| GB | 2 431 302 | 4/2007 |
| JP | 02-261085 | 10/1990 |
| JP | 03-293993 | 12/1991 |
| JP | H08331826 | 12/1996 |
| JP | 10-146092 | 5/1998 |
| JP | 2000-014190 | 1/2000 |
| JP | 2001-016892 | 1/2001 |
| JP | 2004-528796 | 9/2004 |
| JP | 2006-034082 | 2/2006 |
| RU | 2 141 716 | 11/1999 |
| RU | 2 279 757 | 2/2006 |
| RU | 2 279 173 | 6/2006 |
| WO | 2005/062460 | 7/2005 |

OTHER PUBLICATIONS

The Japanese Office Actions dated Jan. 5, 2010 and Mar. 30, 2010 and English summary thereof.

The Japanese Office Action dated Jun. 29, 2010 and English summary thereof.

* cited by examiner

*FIG.4*
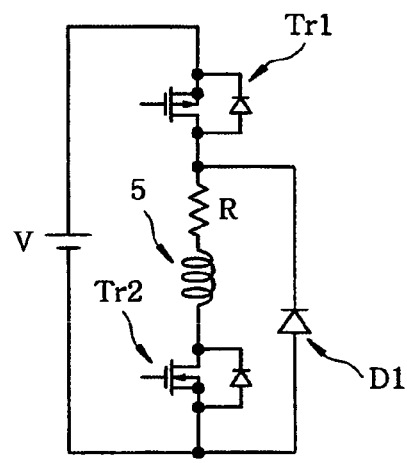
*FIG.5A*  *FIG.5B*  *FIG.5C*
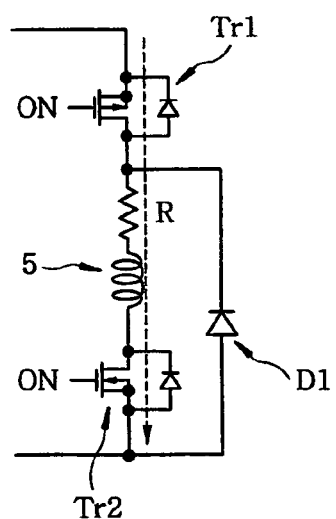 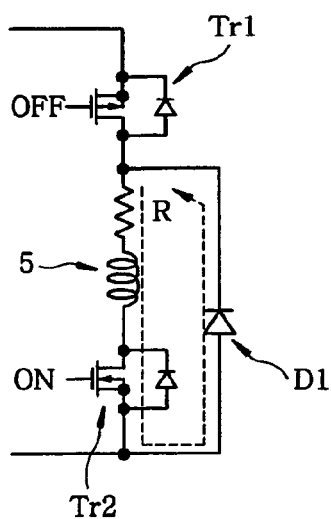 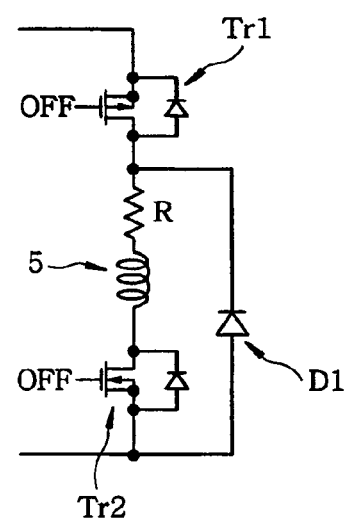

ELECTROMAGNETIC ACTUATOR DRIVING METHOD

FIELD OF THE INVENTION

The present invention relates to a method for driving a vibrating-type electromagnetic actuator preferably applicable to an electric shaver and designed to cause a movable body to make reciprocating movement.

BACKGROUND OF THE INVENTION

A driving circuit for a vibrating-type electromagnetic actuator is known in the art as a driving circuit that drives a resonance system capable of converting or preserving energy through the use of the elasticity of an elastic body and the inertia of a movable body with mass. The vibrating-type electromagnetic actuator includes a stator with a coil, a movable body with a permanent magnet, and a frame portion for reciprocatably supporting the movable body through a spring, the stator being fixed to the frame portion. The driving circuit for this vibrating-type electromagnetic actuator reciprocates the movable body through sensorless feedback control of the application time of an alternating voltage applied to the coil. At this time, a signal indicative of the position where the moving direction of the movable body is inverted (hereinafter referred to as a "phase reference signal"), i.e., a signal indicative of the timing at which the induced electromotive voltage excited in the coil becomes nearly zero, and a signal indicative of the velocity of the movable body ((hereinafter referred to as a "velocity signal"), i.e., the induced electromotive voltage available after a specified time has lapsed from detection of the phase reference signal, are used as control signals (see, e.g., Japanese Patent Laid-open Publication Nos. 7-265560 and 7-313749).

In an effort to reduce the number of parts and to curtail the costs required in installing a sensor, the conventional driving circuit performs the sensorless feedback control in which the induced electromotive voltage is used as one of the control signals. It is, however, impossible to accurately detect the induced electromotive voltage during the time when a magnetizing current or a freewheeling current remains in the coil. Therefore, there is a need to provide a non-magnetizing period within which to detect the induced electromotive voltage. The non-magnetizing period can be provided by predicting the timing at which the phase reference signal appears and then terminating magnetization at the predicted timing without affecting the phase reference signal. When detecting the velocity signal during this non-magnetizing period, a sufficiently amplified voltage and a high enough processing speed of CPU are required in order to detect a minute change in the induced electromotive voltage available after a specified time has lapsed from detection of the phase reference signal. This makes it difficult to construct the driving circuit in a cost-effective manner.

SUMMARY OF THE INVENTION

In view of the above, the present invention provides an electromagnetic actuator driving method that makes it possible to construct a driving circuit in a cost-effective manner.

In accordance with an aspect of the present invention, there is provided an electromagnetic actuator driving method for driving an electromagnetic actuator including a stator and a movable body, the stator including a core provided with a plurality of magnetic poles and a coil wound on at least one of the magnetic poles, the movable body including a permanent magnet arranged to oppose tip end surfaces of the magnetic poles through a magnetic gap, the movable body being supported in such a manner as to make reciprocating movement in a direction perpendicular to a direction in which the permanent magnet opposes the magnetic poles, the movable body being reciprocated upon applying an alternating voltage to the coil, the method including:

performing feedback control of the alternating voltage in which the alternating voltage is applied to the coil during a first half of a control period and in which an induced electromotive force generated in the coil during a second half of the control period is used as a control signal.

With the electromagnetic actuator driving method of the present invention, the coil is excited only in the first half of the control period. Thanks to this feature, it is possible to reduce the number of component parts of the inverter circuit that applies the alternating voltage to the coil, which makes it possible to construct the inverter circuit in a cost-effective manner. With the electromagnetic actuator driving method of the present invention, the control signals can be detected with no restriction in time, voltage accuracy, current accuracy and the like. This makes it possible to reduce the number of sensor parts. In addition, it is possible to reduce the number of wiring lines leading to the control circuit such as the central processing unit or the like, which makes it possible to construct the control circuit in a cost-effective manner. Therefore, the electromagnetic actuator driving method of the present invention is capable of providing a low-priced driving circuit.

BRIEF DESCRIPTION OF THE DRAWINGS

The objects and features of the present invention will become apparent from the following description of embodiments, given in conjunction with the accompanying drawings, in which:

FIG. 4 is a circuit diagram showing the configuration of an inverter circuit of the driving circuit shown in FIG. 2;

FIGS. 5A, 5B and 5C are circuit diagrams for explaining the operation of the inverter circuit shown in FIG. 4;

DETAILED DESCRIPTION OF THE PREFERRED EMBODIMENTS

Hereinafter, an electromagnetic actuator driving method in accordance with one embodiment of the present invention will be described with reference to the accompanying drawings which form a part hereof.

[Configuration of Electromagnetic Actuator]

Figure 1A:
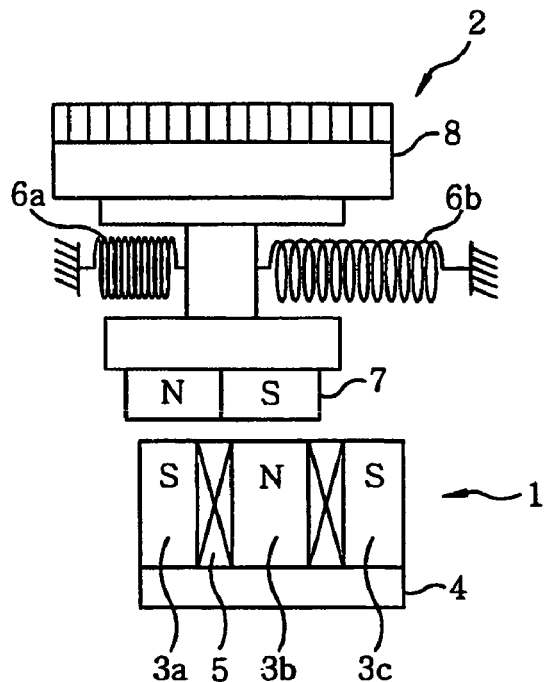
FIGS. 1A and 1B are front views showing an electromagnetic actuator driven by a method in accordance with one embodiment of the present invention.
Figure 1B:
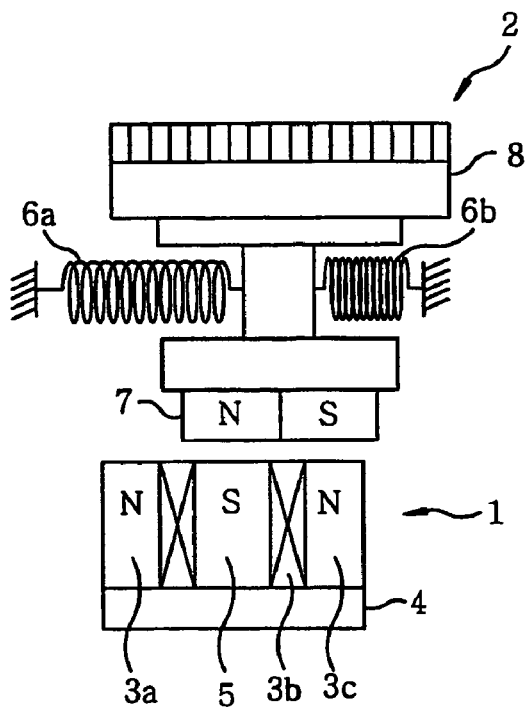

As shown in FIGS. 1A and 1B, an electromagnetic actuator driven by a method in accordance with one embodiment of the present invention includes a stator 1 and a movable body 2 as its major component parts. The stator 1 includes an E-shaped core 4 provided with three magnetic poles 3a, 3b and 3c and a coil 5 wound on the magnetic pole 3b. The movable body 2 is arranged to oppose the free end surfaces of the magnetic poles 3a, 3b and 3c with a magnetic gap left therebetween. The movable body 2 includes a permanent magnet 7 and a magnetic flux permeation body 8 serving as a back-yoke. The movable body 2 is reciprocatable along the magnetic poles 3a, 3b and 3c and is supported so as to return to the central position of a moving range by springs 6a and 6b.

The permanent magnet 7 has different magnetic poles arranged in the left-right direction, i.e., in the reciprocating direction thereof. The distance between the centers of the magnetic poles of the permanent magnet 7 is set substantially equal to the distance between the centers of the magnetic poles 3a and 3b and the distance between the centers of the magnetic poles 3b and 3c. The width W1 of the permanent magnet 7 is smaller than the maximum width W2 of the magnetic poles 3a and 3c arranged at the left and right ends. The sum of the stroke ST of the movable body 2 and the width W1 is equal to or smaller than the maximum width W2 (W2≧W1+ST).

[Configuration of Driving Circuit]

Figure 2:
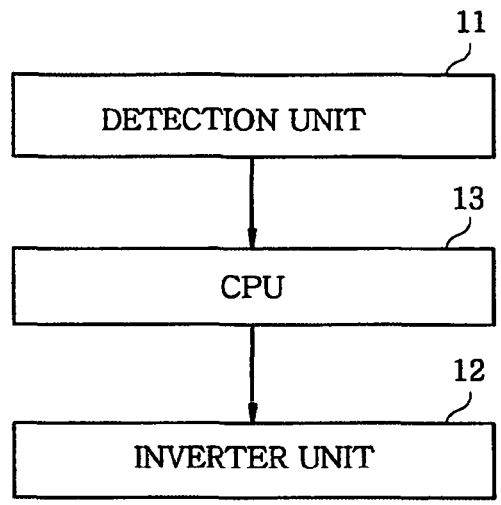
FIG. 2 is a block diagram showing the configuration of a driving circuit of the electromagnetic actuator shown in FIG. 1.

Referring to FIG. 2, a driving circuit for the electromagnetic actuator includes a detection unit 11 for detecting a phase reference signal indicative of the position where the moving direction of the movable body 2 is inverted and a velocity signal indicative of the velocity of the movable body 2 and a central processing unit (CPU) 13 for controlling the inverter circuit 12 based on the phase reference signal and the velocity signal detected by the detection unit 11 to thereby control the application time of the alternating voltage applied to the coil 5.

Figure 3:
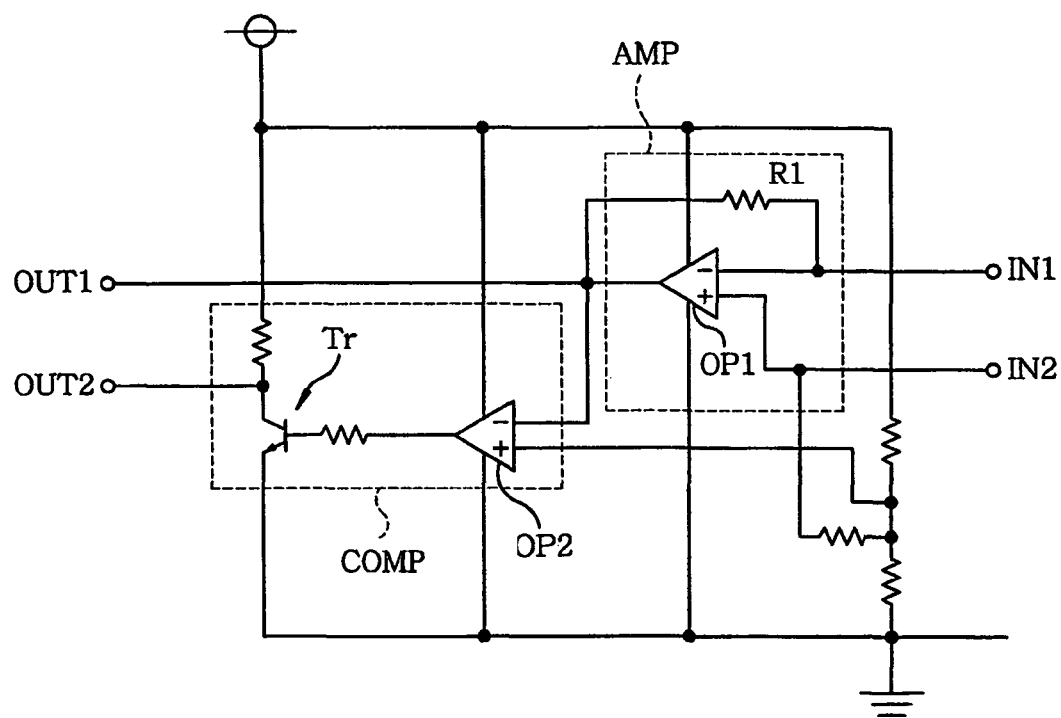
FIG. 3 is a circuit diagram showing the internal configuration of a detection unit of the driving circuit shown in FIG. 2.

As shown in FIG. 3, the detection unit 11 includes an amplifier AMP having an operational amplifier OP1 and a comparator COMP having an operational amplifier OP2 and a transistor circuit Tr. The amplifier AMP amplifies the voltage between the ends of the coil 5 (the voltage between input terminals IN1 and IN2) with an amplification ratio defined by the resistance of a resistor R1 and then outputs the amplified signal to the operational amplifier OP2 and an output terminal OUT1 as the velocity signal. The comparator COMP detects the phase reference signal and then outputs same to an output terminal OUT2. Alternatively, the CPU 13 may detect the phase reference signal by comparing the inverted input and the output of the operational amplifier OP1 through the use of an AD port or a built-in comparator. In this case, it is possible to omit the comparator COMP.

As shown in FIG. 4, the inverter circuit 12 includes a power source V, an upper transistor circuit Tr1, a lower transistor circuit Tr2 and a diode D1. In case the upper and lower transistor circuits Tr1 and Tr2 are all in an on-state as shown in FIG. 5A, the inverter circuit 12 applies an alternating voltage to the coil 5. If the upper transistor circuit Tr1 is turned off in the state shown in FIG. 5A, an electric current circulates through the coil 5 by virtue of a flywheel effect as shown in FIG. 5B. Then, if the lower transistor circuit Tr2 is turned off in the state shown in FIG. 5B, a non-magnetization state is established as shown in FIG. 5C. In this manner, the inverter circuit 12 controls the alternating voltage applied to the coil 5 by controlling the combination of on-time, off-time and on/off operation of the upper and lower transistor circuits Tr1 and Tr2. With this configuration, it is possible to reduce the number of transistor circuits as compared to the conventional inverter circuit (the full bridge circuit) that employs four transistor circuits. This makes it possible to reduce the number of wiring lines leading to the corresponding driver and the CPU 13.

[Driving Method]

If an alternating voltage with a rectangular waveform is applied to the coil 5 of the electromagnetic actuator configured as above, a driving force is generated in the movable body 2 by the magnetic force of the magnetic flux between the magnetic poles 3a and 3b and the permanent magnet 7 while the magnetic poles 3a, 3b and 3c are with the polarity shown in FIG. 1A. Thus the movable body 2 is moved to the left in FIG. 1A. In contrast, during the time the magnetic poles 3a, 3b and 3c are magnetized with the polarity shown in FIG. 1B, a driving force is generated in the movable body 2 by the magnetic force of the magnetic flux between the magnetic poles 3b and 3c and the permanent magnet 7. Thus the movable body 2 is moved to the right in FIG. 1B. When no alternating voltage is applied to the coil 5, the movable body 2 is returned to the center position of the moving range under the biasing forces of springs 6a and 6b. In this way, the movable body 2 reciprocates in the left and right direction as the alternating voltage is applied to the coil 5.

Figure 6:
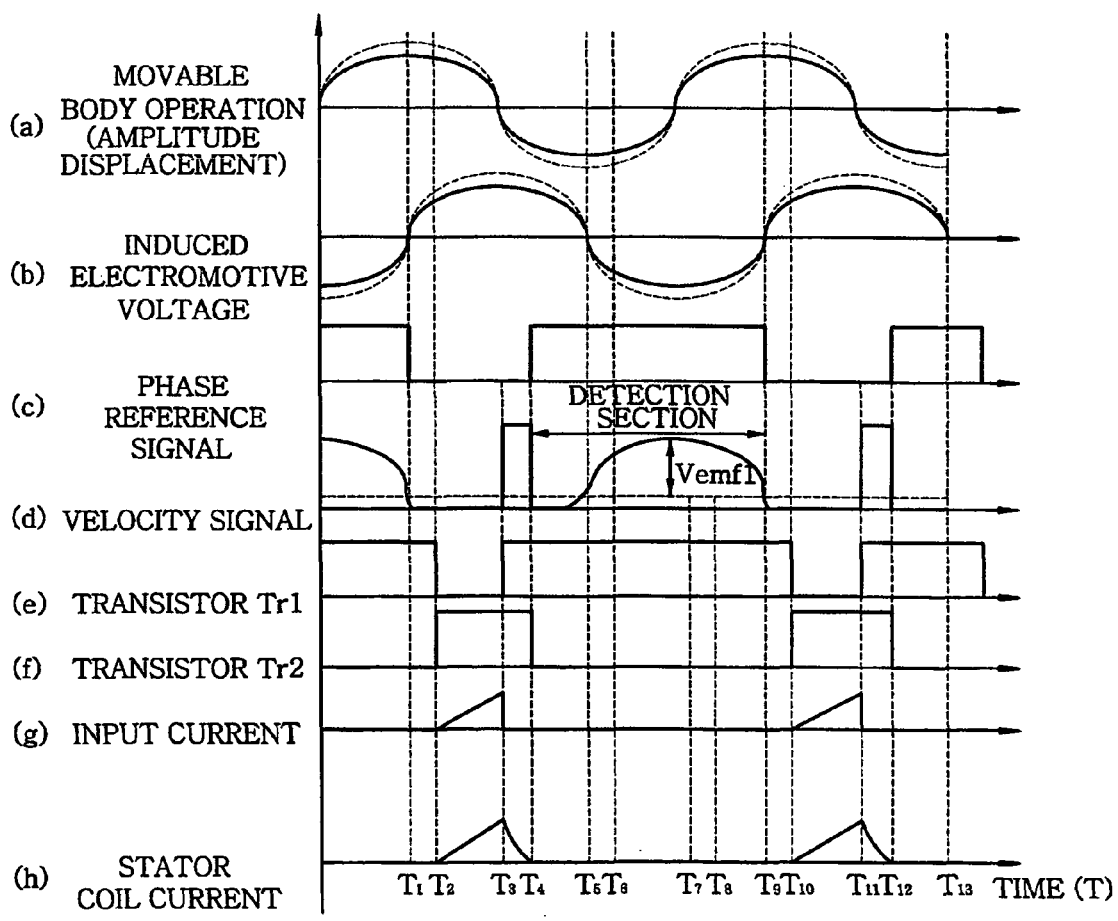
FIG. 6 is a timing chart for explaining an electromagnetic actuator driving method in accordance with one embodiment of the present invention.

In the present embodiment, as illustrated in FIG. 6, the CPU 13 applies an alternating voltage to the coil 5 during one half of a control period. During the other half of the control period, i.e., in a non-magnetized state, the central processing unit 13 performs feedback control in which a phase reference signal (see (c) of FIG. 6) and a velocity signal (see (d) of FIG. 6) are detected from an induced electromotive voltage (see (b) of FIG. 6) with a sinusoidal waveform and are used as control signals. With this driving method, the coil 5 is magnetized during one half of the control period. Thanks to this feature, it is possible to reduce the number of component parts of the inverter circuit 12 that applies an alternating voltage to the coil 5, which makes it possible to construct the driving circuit in a cost-effective manner. Furthermore, since the control signals can be detected with no restriction in time, voltage accuracy, current accuracy and the like, it is possible to reduce the number of sensor parts. In addition, it is possible to reduce the number of wiring lines leading to the central processing unit 13, which makes it possible to construct the control circuit in a cost-effective manner. Moreover, since the period conventionally kept in a non-magnetized state for sensing purposes can be used in the magnetization in the present embodiment, it is possible to enhance the output performance with the same input voltage.

It is preferred that the central processing unit 13 uses the induced electromotive voltage as its control signals while the induced electromotive voltage is increased from zero to the maximum value. During the time the induced electromotive voltage is increased from zero to the maximum value, the voltage difference acquired is three or four times as great as the voltage difference available in the conventional control, and the difference in voltage variation per 1 mm of displacement is five times greater than that of the conventional control. With the present driving method, therefore, the amplifier AMP is permitted to have a degree of precision equal to about 1/5 of the degree of precision required in the conventional amplifier. This makes it possible to construct the detection unit 11 in a cost-effective manner. Such relaxation of the requirements on the degree of precision makes it possible to change the control method and to save the cost of the central processing unit 13, which has been unavailable in the conventional driving circuit.

The central processing unit 13 may use, as its control signals, the maximum value of the induced electromotive voltage having a sinusoidal waveform. With this configuration, the control can be performed merely by detecting the maximum value of the induced electromotive voltage, which makes it possible to save the cost of the central processing unit 13. Alternatively, the central processing unit 13 may use, as its control signals, the integration value of the induced electromotive voltage having a sinusoidal waveform. With this configuration, it becomes possible to detect the lost energy during the half control period, which cannot be detected when using the maximum value of the induced electromotive voltage or the partial voltage. Therefore, it is possible to increase the control accuracy and to reduce the cost of the central processing unit 13 or the sensor.

Figure 7:
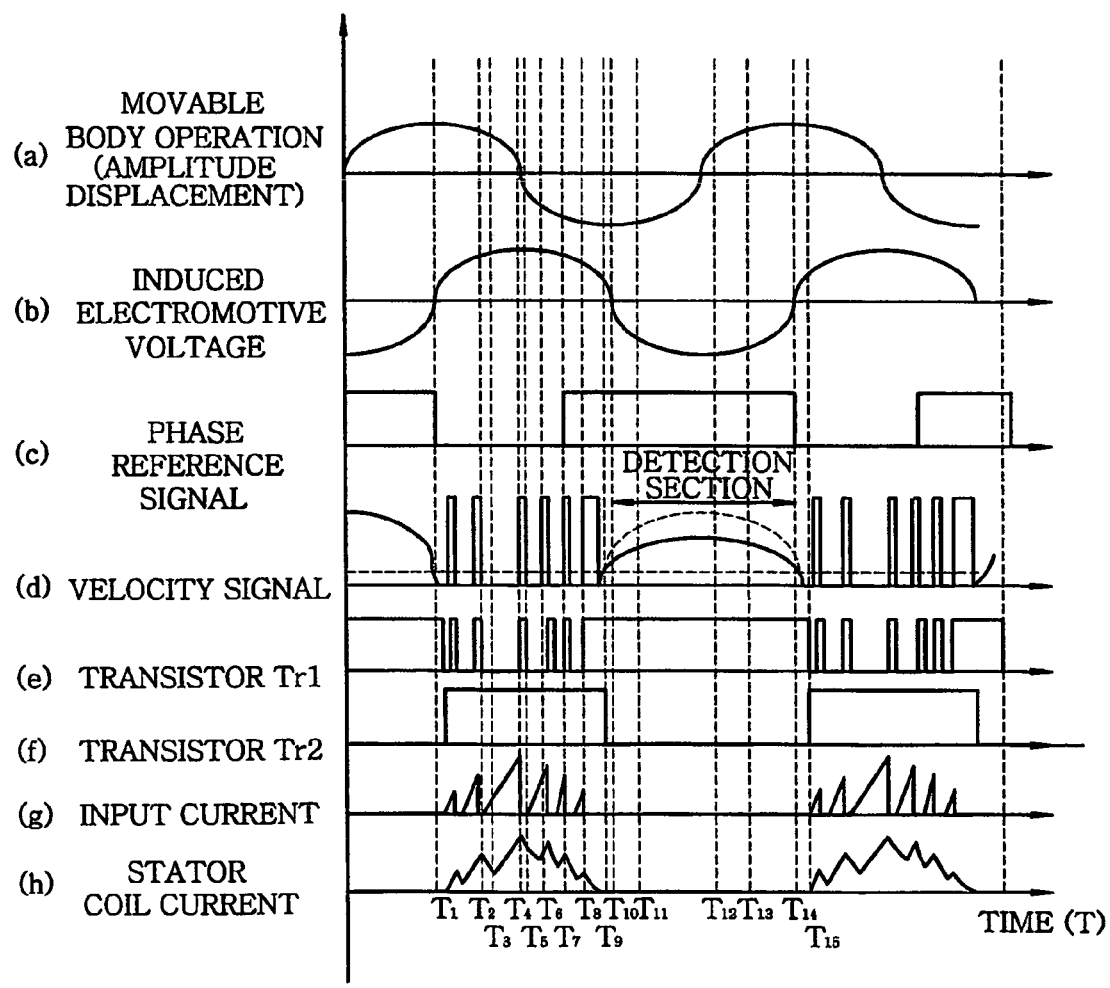
FIG. 7 is a timing chart for explaining a modified example of the electromagnetic actuator driving method illustrated in FIG. 6.

The central processing unit 13 may use at least two of these control methods in combination. As illustrated in FIG. 7, the central processing unit 13 may calculate the deviation between an induced electromotive force and a target value in every displacement of the movable body 2 and may change the duty ratio of the control output depending on the deviation thus calculated. With this driving method, the triangular waves required in the pulse width modulation PWM can be generated by virtue of software and not hardware. This makes it possible to reduce the cost.

While the invention has been shown and described with respect to the embodiments, it will be understood by those skilled in the art that various changes and modification may be made without departing from the scope of the invention as defined in the following claims.

What is claimed is:

1. An electromagnetic actuator driving method for driving an electromagnetic actuator including a stator and a movable body, the stator including a core provided with a plurality of magnetic poles and a coil wound on at least one of the magnetic poles, the movable body including a permanent magnet arranged to oppose tip end surfaces of the magnetic poles through a magnetic gap, the movable body being supported on the electromagnetic actuator in such a manner as to make reciprocating movement in a direction perpendicular to a direction in which the permanent magnet opposes the magnetic poles, the method comprising:

the movable body being reciprocated upon applying an alternating voltage to the coil, performing feedback control of the alternating voltage in which the alternating voltage is applied to the coil during a first half of a control period, in which the coil is in a non-magnetized state during a second half of the control period; and wherein a control signal is detected from an induced electromotive force generated in the coil during the second half of the control period.

2. The electromagnetic actuator driving method of claim 1, wherein the induced electromotive force comprises an induced electromotive voltage with a sinusoidal waveform generated in the coil during the second half of the control period.

3. The electromagnetic actuator driving method of claim 2, wherein the induced electromotive voltage with a sinusoidal waveform is used as the control signal while the induced electromotive voltage increases from zero to a maximum value.

4. The electromagnetic actuator driving method of claim 3, wherein the maximum value of the induced electromotive voltage is used as the control signal.

5. The electromagnetic actuator driving method of claim 2, wherein an integration value of the induced electromotive voltage is used as the control signal.

6. The electromagnetic actuator driving method of claim 1, wherein the alternating voltage is applied to the coil by an inverter circuit including a transistor circuit, the transistor circuit being on-off controlled to apply the alternating voltage to the coil under a flywheel effect.

7. The electromagnetic actuator driving method of claim 6, wherein the transistor circuit of the inverter circuit includes upper and lower transistor circuits, and wherein the on-time, off-time and on/off operation of the upper and lower transistor circuits is controlled in combination.

8. The electromagnetic actuator driving method of claim 7, wherein the lower transistor circuit is kept in an off-state during the second half of the control period.

9. The electromagnetic actuator driving method of claim 1, wherein the deviation of the induced electromotive force from a target value is calculated in every displacement of the movable body, and wherein the duty ratio of a control output is changed depending on the deviation thus calculated.

* * * * *